Figures 1, 2, 3, 4:
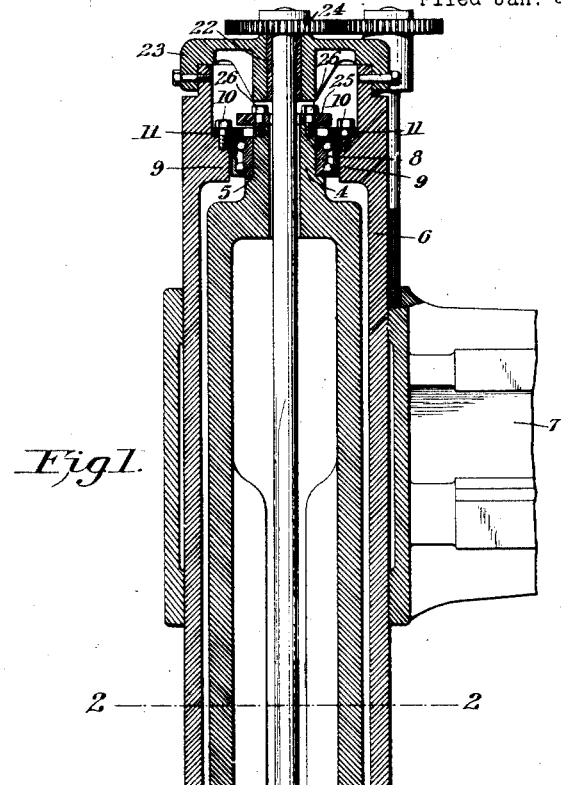

April 30, 1929.  D. C. KLAUSMEYER  1,710,829
SLEEVE SUSPENSION FOR DRILLS
Filed Jan. 3, 1924

Inventor
David C. Klausmeyer
By Attorney
Albert F. Nathan

Patented Apr. 30, 1929.

1,710,829

UNITED STATES PATENT OFFICE.

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO.

SLEEVE SUSPENSION FOR DRILLS.

Application filed January 3, 1924. Serial No. 684,153.

This invention relates to power-driven drilling-machines and deals more especially with the type known as "radial drills" which involve the use of a column providing for the elevation and depression of a drill-supporting arm radiating horizontally therefrom and, usually also, providing for a swing of said arm in a horizontal plane; thereby affording a universal adjustment for the drill.

In such machines, by reason of the weight and length of the arm, of the weight of the head, and the thrust of the drill, the column is subjected to severe bending loads and it is usually formed of two members, i. e. the primary member, in the nature of a post or trunk, and a secondary member, usually in the nature of a sleeve, adapted to serve as a pivotally-acting element to provide for the swing of the radial arm.

From a standpoint of efficiency it is essential that these parts be constructed with great rigidity otherwise distortion therein, when the drill is under strain, would cause the production of imperfect work. Likewise, transportation and working considerations demand that they be constructed as lightly as is consistent with the strains to be withstood. Furthermore, as it is necessary for the attendant, with his limited strength, manually to swing the radial arm about the column to position the drill with respect to the work, it is essential that the sleeve, when un-clamped, be freely rotatable on the post.

Towards meeting these various requirements, it is advisable to construct the post as a tubular member (suitably strengthened by a series of internal radial ribs) and to support the sleeve upon an anti-friction bearing seated upon the upper end of the post; also to provide radial bearings between the post and sleeve to withstand the lateral thrusts and to prevent cramping between the post and sleeve.

To provide means for adjusting the arm vertically on the sleeve, and for rotating the drill spindle, it has been found convenient to provide a power shaft having one end extending into the base of the post where it is operatively connected to an upright shaft journaled lengthwise of the column and from the upper end of which power may be taken to effect the desired adjustments and operations.

To enable the upper end of the sleeve to be interiorly machined and certain parts to be assembled therein, it is desirable to have it cast with an open upper end which, subsequently, is closed by a separate cap secured to the upper end of the sleeve and providing a bearing for the motion-transmission shaft. Heretofore, it has been common practice to have this cap serve as a connecting element between the sleeve and the post and to carry the weight of the suspended sleeve and the attached arm.

This invention has for an object to provide an improved and simplified construction for supporting (independently of the cap) the sleeve on the post; for holding the sleeve accurately co-axial with the post and for preventing separation of the sleeve from the post when the drill is being hoisted.

A further object is so to support the sleeve upon the post that the cap is free of all strain and may be removed without disturbing the relation of the sleeve and post.

A still further object of the invention is to provide means whereby the lower driving gears may be quickly and easily removed and replaced and to combine therewith simple and effective means for preventing accidental contact with the driving shaft.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Fig. 1 is a central vertical section of a radial drill embodying the present invention; the radial arm being broken off. Fig. 2 is a section on the line 2—2 of Fig. 1. Fig. 3 is a detail plan showing a removable gear-unit and the protecting element for the drive shaft carried thereby and Fig. 4 is a section on the line 4—4 of Fig. 1.

Referring more particularly to the drawings, the invention is disclosed in a radial drill comprising a base 1 upon which is rigidly secured the enlarged lower end $2^a$ of a tubular post 2 suitably strengthened by internal ribs 3 and formed at its upper end with a reduced neck 4 affording an annular seat 5.

Upon the post 2 is rotatably journaled a sleeve 6 to which is adjustably secured a radial arm 7 supporting, in a manner common to machines of this type, a suitable drill-head (not shown) carrying the usual drill-spindle and drill-point secured therein The enlarged lower portion of the post 2 is formed with a truly cylindrical portion $2^b$ upon which the lower end $6^a$ of the sleeve is adapted to be clamped, by a conventional form of clamping mechanism, to prevent relative rotation between the sleeve and post.

One of the principal features of this invention consists of the novel way in which the sleeve 6 is supported upon the post 2 and maintained co-axially therewith. This novel arrangement embodies a combined radial-and-thrust-bearing 8 fitted to the neck 4 of the post and supported upon the annular seat 5. Co-operating with the bearing 8 is an annular flange 9 formed upon the inner surface of the sleeve 6. The inner surface of the flange 9 snugly embraces the bearing 8 whereby the sleeve is maintained co-axial with the post. Upon the upper surface of the flange 9 is secured, by bolts 10, a thrust ring 11. This ring projects inwardly beyond the flange and bears upon the bearing 8. Thus it will be observed that the sleeve is supported upon the upper end of the post and maintained co-axial therewith by a single anti-friction bearing acting in transverse directions.

To maintain the lower end of the sleeve co-axial with the post, the latter is preferably provided with a truly-cylindrical finished surface 12 which is embraced by a like finished surface 13 formed upon the interior of the sleeve 6.

Power, to rotate the drill-spindle and to lift the arm along the sleeve, preferably is introduced into the machine through a power-shaft 14 journaled appropriately on the base and extending transversely of the post. This shaft 14 is operatively connected, through a gear-unit U, including bevel gears 15 and 16, to an upright shaft 17 journaled lengthwise of the post and from which the various mechanisms may be actuated, as later will be explained.

The gear-unit U preferably comprises a frame $17^a$, removably secured to the base 1 beneath the post, and provided with transversely disposed bearings $17^b$ and $17^c$ within which are journaled, respectively, the gears 15 and 16.

The gear 15 is splined to the shaft 14 and the gear 16 is likewise splined to the shaft 17. This construction greatly facilitates the assemblage of the machine as the gear-unit may be completely assembled and bodily inserted within the post after the post and base have been secured together.

To permit of the ready insertion of the gear unit, after the post and base have been assembled, the enlarged portion $2^a$ of the post, is provided with a portal P, and the base is formed with a recess 18, directly beneath the portal, within which the depending portions of the gear-unit are received.

The insertion of the gear-unit is effected by placing the plate $17^d$ flat upon the upper surface of the base 1, with the bearing $17^c$ extending into the recess 18, and pushing it bodily through the portal until the positioning pins $p$, carried by the frame $17^a$, enter suitable apertures formed in the base, in which position the gear-unit is secured by bolts $b^x$.

It is to be noted that the recess 18 is formed with straight unbroken walls and that the gear-unit contact with the base 1 only upon the upper surface thereof. The recess may, therefore, be cast in the base and inasmuch as the gear-unit has no contact with the walls of the recess no machining of the walls is necessary.

With the gear-unit secured in position the shaft 17 may be inserted into the top of the post and let down through the bearing 21 until the lower end of the shaft is connected by the spline $s$ to the gear 16. Likewise, the shaft 14 may then be inserted horizontally into the gear 15.

The gear-unit may be readily removed from the machine for inspection and for replacement of the gears, when they become worn, by merely withdrawing the shafts 14 and 17 in the converse manner and removing the bolts that hold the gear unit in position, without removing the post from the base.

One of the important features of this invention consists in the simplicity of construction and attachment to the base 1, of the gear unit U. The frame $17^a$ includes a plate $17^d$ having at opposite sides projecting finished surfaces $a$, $b$ and $c$. When the unit U is located in its operative position the surfaces $a$ rest upon the finished top of the base 1 and the unit is held against lengthwise movement by means of the bolts $b^x$ passing through apertures in the rear end of the frame and threaded into the base 1. The positioning pins $p$ insure the location of the frame so that the axis of the shaft 14 will coincide with the axis of the shaft 17. Suitable guide-bars G, secured by bolts $d$ upon the base 1, contact with the surfaces $b$ and $c$ and hold the gear-unit against upward and lateral movement.

It is to be noted that all of the bearing surfaces $a$, $b$ and $c$ of the frame $17^a$ are so arranged that they are easily machined and that by securing the frame directly upon the upper face of the base all difficult machine work on the base, to form a seating for the gear-unit, is eliminated, and also that great rigidity is thereby secured.

Inasmuch as the rotating drive-shaft 14 is, as in prior machines, located adjacent the base and extends exteriorly of the post, it has heretofore been a constant source of danger to the operator. This invention contemplates a simple and effective means for preventing the operator, or his clothing, from coming into accidental contact with the drive shaft. This means may conveniently consist of a metal tube 19 completely enclosing the drive shaft from where it emerges from the portal P. This tube is preferably held concentric with the shaft by having one end held within a suitable aperture formed in an upstanding lug 20 integral with the gear-unit. Any suitable means may be employed for holding the opposite end of the tube concentric with the shaft.

Adjacent its lower end, the upright shaft 17 is preferably journaled in a bearing 21 supported by the ribs 3 of the sleeve 2 and, at its upper end, in a bearing 22 provided by the cap 23 secured upon the upper end of the sleeve 6. This shaft may have secured to it, at its upper end, means, such as a gear 24, whereby motion may be transmitted to the spindle rotating mechanism and also utilized, through a conventional instrumentality, for raising or lowering the arm. These parts being conventional need not be described. It is to be noted that the cap 23 is entirely separate and independent from the means for supporting the sleeve on the post and is therefore free of all strain and may be removed from the sleeve without disturbing the relation between the sleeve and the post.

It frequently happens, in the transportation of a drill, that it is hoisted by means of a rope placed around the arm and sleeve. To prevent the sleeve from being lifted off of the post, when the drill is hoisted, this invention provides an internal plate 25 secured by bolts 26 to the neck 4 of the post. This plate overlies the thrust ring 11 and, when the drill is hoisted, contacts therewith and thereby prevents material displacement of the sleeve on the post.

From the foregoing, it will be observed that there has been provided an improved structure which is simple in construction, efficient in operation and which meets all of the requirements as regards to manufacture, transportation and use.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A radial drill combining a post; a sleeve rotatably journaled thereon; an annular flange formed upon the inner surface of said sleeve; a sleeve-supporting ring removably secured upon the top surface of said flange; a cap secured to the upper end of said sleeve; and means for supporting the weight of said sleeve upon the upper end of said post independent of said cap, said means including an anti-friction bearing seated upon said post and upon which said ring bears.

2. A radial drill combining a base; an upright post secured thereto and provided at its upper end with a reduced neck and an annular shoulder; a sleeve circumscribing said post and rotatably journaled thereon; an internal annular flange formed within said sleeve adjacent said neck; a combined radial- and thrust-bearing seating upon said annular shoulder and located intermediate said reduced neck and said flange and in contact with both; a thrust ring secured upon said flange and projecting inwardly therefrom and overlying said bearing; said bearing being so constructed and arranged with respect to said neck, flange, and thrust-ring that it acts in transverse directions to support the weight of said sleeve on said post and to maintain the upper end of said sleeve co-axial with said post; and a strain-free cap for closing the upper end of said sleeve.

3. A radial drill combining a base; an upright post secured thereto and provided at its upper end with a reduced neck; a combined radial- and thrust-bearing held upon said neck; a sleeve rotatably journaled upon said post; an annular flange within the upper end of said sleeve and contacting with the periphery of said bearing to maintain said sleeve co-axial with said post; a thrust-ring secured upon said flange and resting upon the top of said bearing to support the weight of said sleeve on said post; a normally idle thrust-ring secured upon said neck and spaced above and overlapping said first-mentioned thrust-ring and adapted to contact therewith to prevent material displacement of said sleeve on said post when the drill is being hoisted.

4. A radial drill combining a base formed in its upper face with a recess; a tubular post provided at its lower end with an enlarged portion formed with a portal in registry with said recess; a horizontal driving shaft adjacent said base; a vertical driven shaft within said post; a removable gear-unit, insertable through said portal and held within said recess, a pair of intermeshing bevel-gears carried by said gear-unit of which one is secured to said driving shaft and the other is secured to said driven shaft for operatively connecting said shafts; a lug on said gear-unit forming a substantial closure for said portal; and a protecting tube surrounding said driving shaft and supported at one end in the lug formed upon said gear unit, said protecting tube extending within said portal.

5. A machine tool combining a base; a hollow post upstanding from said base and supported thereby; a driving shaft journaled lengthwise of said base; a driven shaft journaled lengthwise of said post; means for operatively connecting said driving and driven shafts including bevel gears splined to said shafts; a removable frame within which said bevel gears are journaled, said frame being supported wholly upon the upper surface of said base; means entirely at one end of said frame for preventing endwise movement of said frame; and opposed guide bars, each engaging transverse surfaces of said frame to hold it against lateral movement on said base and against upward movement therefrom.

6. A machine-tool combining a base formed with a recess; a hollow post upstanding from said base and supported thereby; a driving shaft journaled lengthwise of said base; a driven shaft journaled lengthwise of said post; a gear-unit for operatively connecting said driving and driven shafts, said gear-unit comprising a supporting frame, formed with a plurality of finished bearing surfaces and two transversely disposed bearings, and two intermeshing bevel gears journaled in said bearings one of which is splined to the driving shaft and the other of which is splined to the driven shaft; said frame being supported wholly upon the upper surface of said base with one of said bearings extending within said recess; and opposed guide-bars secured upon the upper surface of said base and engaging the sides of said frame to hold it against lateral movement, said guide bars also having portions overlying said frame to hold it against upward movement from said base.

7. A radial drill combining a base; a post secured thereto; a sleeve surrounding said post; bearings to maintain said sleeve coaxial with said post; a thrust bearing intermediate the upper end of the post and the sleeve whereby the weight of said sleeve is supported by said post; and a normally inactive thrust bearing comprising overlapped complemental thrust rings carried by the post and sleeve above the thrust bearing which supports the sleeve, said normally inactive thrust bearing being rendered effective only by upward movement of said sleeve on said post and serving to prevent separation of said sleeve and post when the drill is hoisted by said sleeve.

In witness whereof, I hereunto subscribe my name.

DAVID C. KLAUSMEYER.